UNITED STATES PATENT OFFICE.

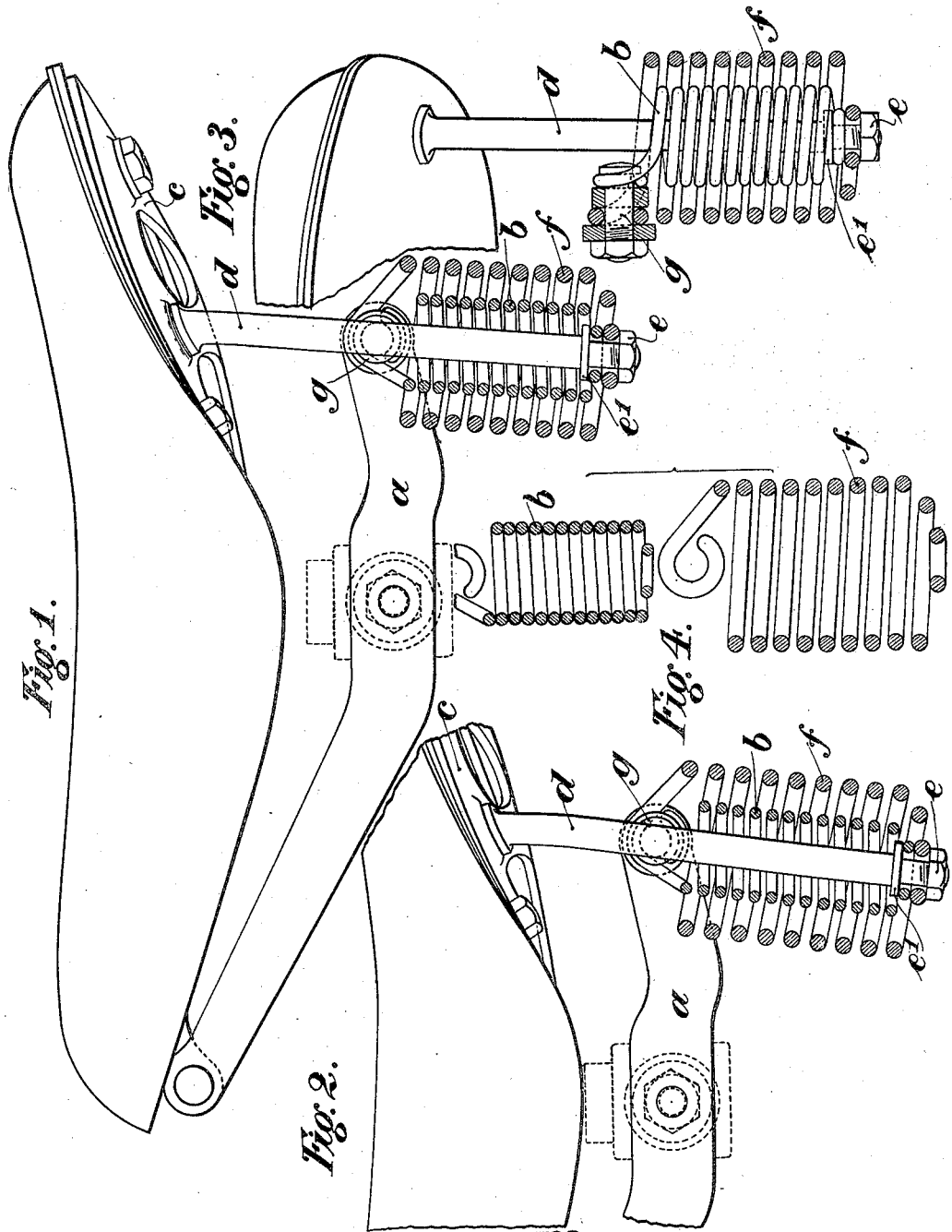

JOHN HOLT, OF BIRMINGHAM, ENGLAND, ASSIGNOR TO J. B. BROOKS AND COMPANY LIMITED, OF BIRMINGHAM, ENGLAND.

SPRING SUPPORTING SYSTEM.

1,075,106.  Specification of Letters Patent.  Patented Oct. 7, 1913.

Application filed December 16, 1912. Serial No. 737,098.

*To all whom it may concern:*

Be it known that I, JOHN HOLT, a subject of the King of Great Britain, residing at Birmingham, England, have invented certain new and useful Improvements in Spring Supporting Systems, of which the following is a specification.

This invention relates to spring supporting systems which may be used as mountings for cycle, motor-cycle, and analogous saddles and seats and other bodies.

The object of the present invention is to provide an improved spring supporting system by which sudden shock due to the reaction or rebound of the spring elements is effectually absorbed or neutralized, and an easy and resilient action insured.

According to the said invention the improved spring system comprises an ordinary close-coiled tension spring which is suspended from or connected to a fixed base and combined with an auxiliary or supplementary open-coiled spring (also suspended from or connected to said base) having its coils separated in their free or normal condition; this auxiliary spring being connected with the primary spring and being of a suitable strength so as to normally maintain the same in a slightly extended condition. The two springs are thus mutually balanced, the primary spring being in a state of tension, and the auxiliary spring in a slight state of compression with its coils open. When the reaction or rebound occurs the open-coiled auxiliary spring resists the closing effect and acts as a compression or cushioning spring for absorbing or neutralizing the shock which would otherwise be occasioned by the sudden closing of the coils of the primary tension spring. The relative strengths of the springs may be so arranged that the said primary spring is just allowed to close without any concussion between the coils.

Figure 1 of the accompanying drawings represents the improved spring system as applied to a motor-cycle or cycle saddle. This view shows the condition of the springs when the saddle is unloaded. Fig. 2 shows how the springs are extended when the saddle is loaded. Fig. 3 is a rear view of one side of the saddle with one of the auxiliary springs in section, and showing more clearly how the springs are attached to and suspended from the base frame. Fig. 4 shows the primary and auxiliary springs in their free condition.

The same letters of reference indicate corresponding parts in each of the figures of the drawings.

At each side of the body to be supported, here shown as constituted by a saddle, there is suspended from the rear end of the fixed frame or base $a$ an ordinary coiled tension spring $b$ whose coils, in their free condition, are closed one against another, as shown in Fig. 4. The frame or cantle plate $c$ of the saddle or other body carries at each side a depending thrust rod $d$ which passes axially through the spring $b$ and is connected to the lower coils of the latter by a nut $e$ and washer $e^1$. Surrounding the said spring $b$ is an auxiliary or supplementary tension spring $f$ which is suspended from the base frame $a$ and arranged concentrically with respect to the inner spring $b$, to whose lower end its bottom coil is connected by the nut $e$, so that both springs are attached to the hanger rod $d$. The outer auxiliary spring $f$ is, however, open-coiled; that is to say, its coils, in their normal condition, are considerably separated, as shown in Fig. 4, and the strength of the said spring is such that it acts on the inner spring so as to maintain the coils of the latter slightly open, as shown in Fig. 1, and the said spring in a state of tension. At the same time the inner spring $b$ re-acts on the auxiliary spring $f$ and slightly closes its coils, so that said auxiliary spring is slightly in a state of compression and the two springs mutually balanced. When the load comes upon the saddle the inner spring $b$ is further extended, as shown in Fig. 2, and the outer spring $f$, after being allowed to expand to its neutral condition (Fig. 4), is also extended, and both springs coöperate for supporting the load. When, however, the springs contract, after having been extended, the sudden closing of the inner spring $b$ is resisted by the outer spring $f$ which, after returning to its normal condition (Fig. 1) tends to be further compressed or closed, and acts as a cushioning medium for absorbing the shock due to the reaction. The auxiliary or outer spring $f$ thus acts as an ordinary tension spring (after expanding to its neutral condition), for supporting the load, but as a compression spring for checking and neutralizing the rebound.

Both springs may be attached to the base frame *a* by the same bolt *g*.

If desired, the open-coiled auxiliary spring may be arranged inside the close-coiled primary spring, instead of outside.

Having fully described my invention, what I desire to claim and secure by Letters Patent is:—

1. The combination, with a base, and a body disposed thereabove and provided with a depending thrust rod; of a spring system for supporting said body comprising a close-coiled, primary tension spring and an auxiliary, open-coiled spring whose coils are separated in their free condition, said springs being connected together at one end to said base and at the other end to said thrust rod and being mutually balanced the auxiliary spring normally maintaining the primary spring in an extended condition and acting so as to oppose the closing of the primary spring beyond its normal extended condition.

2. The combination, with a base, and a body disposed thereabove and provided with a depending thrust rod; of a spring system for supporting said body comprising a close-coiled, primary tension spring and an auxiliary, open-coiled spring arranged one within the other and connected together at their upper ends to said base, said rod projecting axially through said springs and having the lower ends of the latter connected together to its lower end.

In testimony whereof I have hereunto set my hand in presence of two subscribing witnesses.

JOHN HOLT.

Witnesses:
HENRY NORTON SKERRETT,
WILLIAM STAIKS SKERRETT.

---

Copies of this patent may be obtained for five cents each, by addressing the "Commissioner of Patents, Washington, D. C."